United States Patent [19]

Stephens et al.

[11] Patent Number: 4,966,429

[45] Date of Patent: Oct. 30, 1990

[54] OPTICAL SCALE READING APPARATUS

[75] Inventors: William F. N. Stephens, Badminton; Shane W. Thornton, Cambridge, both of United Kingdom

[73] Assignee: Renishaw plc, Gloucestershire, United Kingdom

[21] Appl. No.: 399,238

[22] Filed: Aug. 29, 1989

[30] Foreign Application Priority Data

Sep. 2, 1988 [GB] United Kingdom ............ 8820776.6

[51] Int. Cl.$^5$ ............................................ G02B 27/02
[52] U.S. Cl. .............................. 350/96.10; 350/96.12; 350/96.13; 350/110
[58] Field of Search ............... 350/96.10, 96.12, 96.13, 350/110, 114; 362/32

[56] References Cited

U.S. PATENT DOCUMENTS 3,635,135 1/1972 Ambraschka ................. 362/32 X
4,011,403 3/1977 Epstein et al. ................ 350/96.10 X Primary Examiner—John D. Lee
Assistant Examiner—Phan T. Heartney
Attorney, Agent, or Firm—Spencer & Frank

[57] ABSTRACT

Optical scale reading apparatus in accordance with the invention includes an optical fibre 30 for directing light from a light source 22 on to a scale 10. Light from the scale is reflected into a readhead 12 of any suitable construction. The fibre is designed to reduce any non-uniformity in the light entering it and various embodiments of the invention are described for achieving the required effect. For example, the length to diameter ratio of the fibre is made to be at least 5:1. Alternatively, or in addition, one or more constrictions are formed in the fibre, and as a further alternative or addition, at least one end face of the fibre is roughened to cause diffusion of the light.

8 Claims, 1 Drawing Sheet

OPTICAL SCALE READING APPARATUS

BACKGROUND OF THE INVENTION

It is known with an optical readhead for reading a scale to use a light emitting diode (LED) as the primary source of illumination for the scale.

Conventionally, an LED comprises a photo-diode provided at the surface of a chip and the surface of the diode has an electrode pad connected to a wire of a driving circuit.

In the arrangement for illuminating the scale, the LED system also includes a lens for collimating the divergent light output of the LED. The lens produces on the scale an image of the electrode in the form of a darkened region. This diminishes the effective area of illumination of the scale and reduces the performance of the readhead particularly as regards tolerance to angular mis-alignment between the scale and the readhead.

A similar problem occurs with aging of the LED when areas of the LED at random emit less light and appear dark.

SUMMARY OF THE INVENTION

The invention eliminates or at least minimises the effects of these problems by the provision of a length of optical fibre between the LED and the scale in place of the lens used hitherto. The length of the fibre needs to be only sufficient to ensure that the internal reflections of the light within the fibre homogenise the available light from the LED so that it is distributed evenly over the cross section of the fibre.

By this means dark regions on the scale can be avoided while retaining the same area of illumination as that which would have been produced by the lens. Thus better use can be made of the available light and a more even light distribution is attained at the plane of the detector of the readhead.

A futher advantage is that the increased stand-off between the LED and the optical elements of the readhead, allows use of a more powerful LED.

In a specific embodiment of the invention it has been found that a length to diameter ratio of about 5 is sufficient to achieve the homogenising effect and achieve an even distribution of light at the illuminated area of the scale.

BRIEF DESCRIPTION OF THE DRAWINGS

An example of the invention will now be more particularly described with reference to the accompanying drawings in which.

DETAILED DESCRIPTION OF THE PREFERRED EMBODIMENTS

Figure 1:
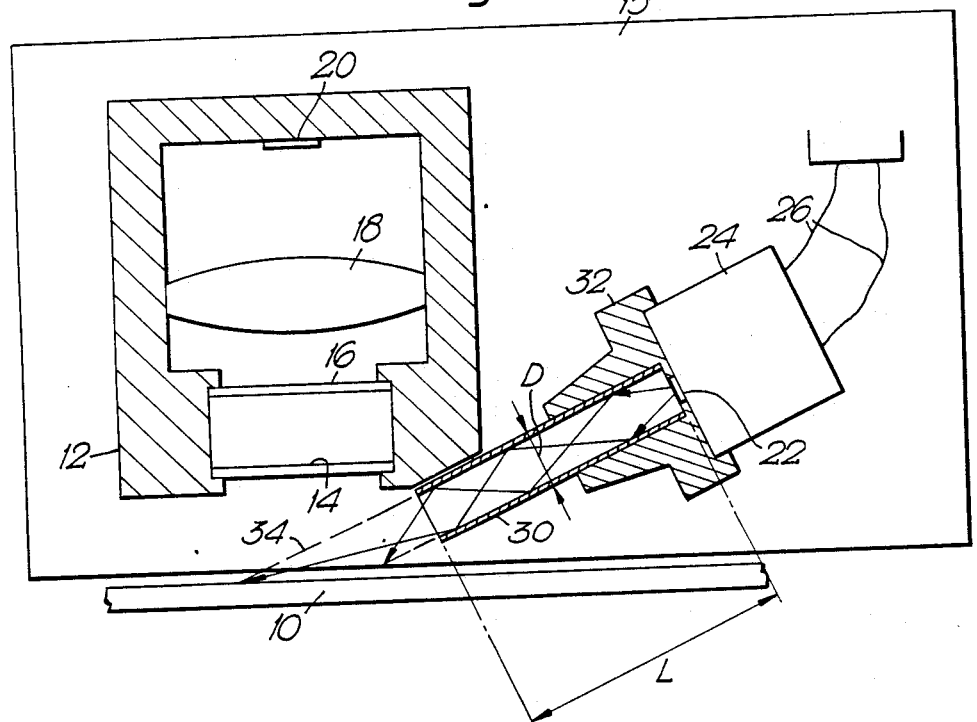
FIG. 1 illustrates an optical scale and readhead arrangement which incorporates an optical fibre in accordance with the invention.

Referring now to the drawings, there is shown in FIG. 1 a scale 10 and readhead 12 mounted on an attachment member 13 for attachment to a machine for measuring in a known manner the relative movement of parts of the machine.

The readhead itself comprises a pair of gratings 14,16 and a lens 18 which focusses an image of the illuminated region of the scale onto a detector 20. The readhead may be of any suitable known type but is preferably of the type described in our International Publication No.

Similarly the scale may be a diffraction quality scale of suitable known type but is preferably also of the type described in the above-mentioned publication for use with the preferred form of readhead.

Figure 3:
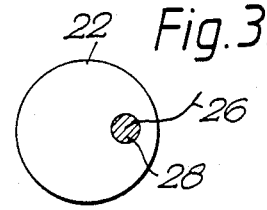
FIG. 3 illustrates a typical image of a LED.

The scale 10 is illuminated by an LED 22 mounted in a housing 24 and powered by a source (not shown) via a pair of leads 26. FIG. 3 is a view of a typical LED image and shows the electrode pad 28 and lead 26 on the front face of the LED which in the prior art system was imaged by a lens onto the scale.

A length of optical fibre 30 is provided at the front face of the LED and is fixed in place by an attachment 32 connected in any convenient manner to the housing 24 of the LED.

Figure 2:
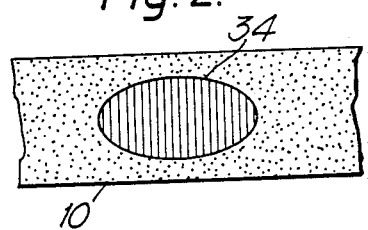
FIG. 2 illustrates the form of the illumination on the scale.

The light emitted from the LED is captured by the fibre, and due to the many internal reflections of the light as it passes down the fibre it emerges from the opposite end of the fibre as a homogeneous beam 34. The beam 34 provides an even area of illumination on the scale with no dark image of the electrode as shown in FIG. 2.

The length L to diameter D ratio of the optical fibre is preferably such that the darkened image of the electrode pad is eliminated altogether. A length/diameter ratio of at least 5 to one and preferably between 5 and 6 to one is sufficient to achieve this. However, if space restraints are such that this cannot be achieved, the effectiveness of a shorter length of fibre in homogenising the light from the LED can be improved by a modification to the fibre as shown in FIG. 4.

Figure 4:
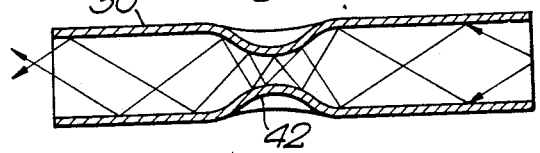
FIG. 4 illustrates a modification to the fibre of FIG. 1

Referring now to FIG. 4 there is shown a length of fibre 30 which includes a constriction 42 in the light path. The constriction, which may be formed by crimping the fibre while hot, induces additional internal reflections of the light passing down the fibre thereby producing the same degree of homogenisation of the light in a shorter length of fibre.

Crimping of the fibre will cause constriction 42 to be formed as a pair of dimples in a plane on either side of the fibre as shown in FIG. 4. However, the constriction may be produced by drawing the fibre to locally reduce its diameter, or by producing a plurality of dimples around the fibre at one position.

Figure 5:
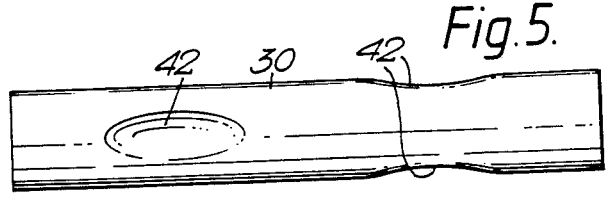
FIG. 5 illustrates a further modification to the fibre of FIG. 1.

Also, additional constrictions may be produced at different positions along the length of the fibre and a preferred embodiment would be produced by providing a second pair of dimples in a plane at right angles to the first pair at a second position along the length of the fibre as shown in FIG. 5.

A further modification which may be made to improve the homogenisation of the light is to roughen the surface finish of the end of the fibre or otherwise provide the end face adjacent the scale with a surface quality adapted to diffuse the light travelling along the fibre.

This modification may also be applied to the end of the fibre furthest from the scale if the method of connecting the fibre allows.

An additional benefit of the use of fibre as described above iq that it may be possible to separate the LED further from optical components of the readhead than hitherto possible and thus allow a more powerful LED to be used.

Although the various modifications to the fibre have been separately described, clearly they may be applied in any combination to optimise the diffusion effect.

We claim:

1. Optical scale reading apparatus for use with a scale, comprising a light source for illuminating the scale; an optical fibre arranged to receive light emitted from the light source and forming an optical path directing the light towards a selected area of the scale; and a readhead positionable to receive light reflected from said area of the scale and which provides output signals indicative of relative movement between said scale and said readhead, wherein said optical fibre includes means for homogenising light received from the light source so that any non-uniformity in light emitted from the light source is reduced before the light illuminates the scale.

2. Optical scale reading apparatus according to claim 1, wherein the length to diameter ratio of the optical fibre extending between the light source and the scale is at least 5:1.

3. Optical scale reading apparatus according to claim 2, wherein said length to diameter ratio of the fibre lies in the range between 5:1 and 6:1.

4. Optical scale reading apparatus according to claim 1, wherein said homogenising means comprises a constriction in the optical path of the optical fibre.

5. Optical scale reading apparatus according to claim 4, wherein a plurality of constrictions are provided in the fibre at different positions along the length of the optical fibres.

6. Optical scale reading apparatus according to claim 1, wherein said homogenising means comprises at least one end face of said fibre having a surface quality adapted to diffuse the light travelling through the fibre.

7. Optical scale reading apparatus according to claim 1, wherein said homogenising means additionally comprises at least one end face of said fibre having a surface quality adapted to diffuse the light travelling through the fibre.

8. Optical scale reading apparatus according to claim 1, in combination with a scale.

* * * * *